United States Patent
Mochizuki

(10) Patent No.: US 9,507,554 B2
(45) Date of Patent: Nov. 29, 2016

(54) DISPLAY/INPUT DEVICE, IMAGE FORMING APPARATUS, AND METHOD FOR CONTROLLING A DISPLAY/INPUT DEVICE

(71) Applicant: KYOCERA Document Solutions Inc., Osaka (JP)

(72) Inventor: Chigusa Mochizuki, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/962,640

(22) Filed: Dec. 8, 2015

(65) Prior Publication Data

US 2016/0188273 A1    Jun. 30, 2016

(51) Int. Cl.
*G06F 3/12* (2006.01)

(52) U.S. Cl.
CPC ........... *G06F 3/1258* (2013.01); *G06F 3/1205* (2013.01)

(58) Field of Classification Search
None
See application file for complete search history.

(56) References Cited

U.S. PATENT DOCUMENTS

| | | | | |
|---|---|---|---|---|
| 6,327,051 B1* | 12/2001 | Moro | ............. | G06K 15/00 358/1.15 |
| 8,681,356 B2* | 3/2014 | Shimizu | ............. | G06F 3/1204 358/1.15 |
| 8,705,060 B2* | 4/2014 | Morita | ............. | H04N 1/00482 358/1.13 |
| 2001/0056449 A1* | 12/2001 | Kawamoto | ............. | G06F 3/1204 715/274 |
| 2005/0286950 A1* | 12/2005 | Kim | ............. | G06F 3/1204 400/76 |
| 2009/0089811 A1* | 4/2009 | Ferlitsch | ............. | G06F 3/1205 719/321 |
| 2011/0149329 A1* | 6/2011 | Moro | ............. | G06K 15/00 358/1.13 |
| 2012/0050781 A1* | 3/2012 | Morita | ............. | G03G 15/5087 358/1.13 |
| 2013/0057916 A1* | 3/2013 | Kubota | ............. | G06F 3/1204 358/1.15 |
| 2013/0063746 A1* | 3/2013 | Araki | ............. | G06F 3/1204 358/1.13 |
| 2013/0207985 A1* | 8/2013 | Kuwano | ............. | H04N 1/00 345/531 |
| 2014/0153023 A1* | 6/2014 | Saito | ............. | G06F 3/1225 358/1.13 |
| 2014/0215374 A1* | 7/2014 | Nakao | ............. | H04N 1/00517 715/771 |
| 2014/0223366 A1* | 8/2014 | Sato | ............. | G06F 3/1204 715/810 |
| 2014/0253965 A1* | 9/2014 | Asai | ............. | G06F 3/1205 358/1.15 |
| 2015/0029552 A1* | 1/2015 | Nishizawa | ............. | G06F 3/1253 358/1.15 |

FOREIGN PATENT DOCUMENTS

JP    2003-223079 A    8/2003

* cited by examiner

Primary Examiner — Ted Barnes
(74) Attorney, Agent, or Firm — Stein IP, LLC

(57) ABSTRACT

A display/input device has an input portion, a display panel, a storage portion, and a control portion. The storage portion stores current value data containing current setting values, default value data, and saved setting data containing setting values changed, on registration, from default values. The control portion extracts, out of the saved setting data, setting values that have not been changed, on registration, from the default values and that differ from current default values, and writes, out of the values, on registration, of the extracted values and the current default values, values selected by a user to the current value data.

8 Claims, 11 Drawing Sheets

| DEFAULT VALUE DATA | | | D1 |
|---|---|---|---|
| FUNCTION No. | FUNCTION | DEFAULT VALUE | |
| 001 | DOUBLE-SIDE PRINTING | Off | |
| 002 | COMBINED PRINTING | Off | |
| 003 | MAGNIFICATION | 100%(SAME SIZE) | |
| 004 | DENSITY | Normal | |
| ... | ... | ... | | ated to be registered is changed from a default value, the default value is stored. In this way, the setting state (saved setting data) is stored.

DISPLAY/INPUT DEVICE, IMAGE FORMING APPARATUS, AND METHOD FOR CONTROLLING A DISPLAY/INPUT DEVICE

INCORPORATION BY REFERENCE

This application is based upon and claims the benefit of priority from the corresponding Japanese Patent Application No. 2014-264534 filed on Dec. 26, 2014, the entire contents of which are incorporated herein by reference.

BACKGROUND

The present disclosure relates to a display/input device that accepts setting of various setting values. The present disclosure also relates to an image forming apparatus incorporating such a display/input device.

Image forming apparatuses such as multifunction peripherals, copiers, facsimile machines, and printers are often provided with a display/input device that allows selection of a kind of job (function), selection of a setting item, and setting of a setting value. It would be convenient if a user who has a setting value which he frequently sets can set it through a simple operation. In would be particularly convenient if a user who has a set of a plurality of setting values which he frequently sets can set them at once through a simple operation. Thus, a function is sometimes available that allows registration of a state (conditions) in which frequently used setting values have been set. This permits a user to restore a setting state at the tine of registration simply by retrieving the registered condition.

For example, one known image forming apparatus allows registration of image formation conditions in the following manner. A job (image formation conditions) is registered in a job memory; the registered job is displayed as an icon on a display portion; when the job is registered, according to a display instruction, the icon of the job registered is automatically displayed. This configuration allows registration as desired, and allows prompt selection of a registered job.

As mentioned above, in an image forming apparatus, a display/input device is often capable of registering a state (conditions) in which setting values have been set by a user (sometimes called a "program function"). A user repeats operations for selecting setting items and for determining setting values so that he will obtain a desired output. The user thereby brings the display/input device into a state where desired setting values have been set. Subsequently, the user enters an instruction to register. This permits a particular setting state to be registered. For example, when a user wants to register a setting state for performing eco printing, in which less toner is used than usual, simultaneously with combined printing, in which a plurality of pages are printed in a single page, then the user sets "On" as the setting value for "eco printing" and "2 in 1" or "4 in 1" for the setting value for combined printing, and registers the selling state. On the other hand, in an image forming apparatus, a display/input device is loaded with default selling values for setting items respectively.

When a setting state is registered, not only setting values set by a user but also setting values for setting items for which no setting has been done may be stored together. Specifically, for a setting item for which a setting value has been changed from a default value through an operation by a user, the setting value set by the user is stored; on the other hand, for a setting item for which a setting value has not been changed from a default value, the default value is stored. In this way, the setting state (saved setting data) is stored.

However, a user creates a setting state so that he will obtain a desired output and then registers it. Accordingly, the user has no or hardly any sense of having registered default values. Thus, inconveniently, even when a user retrieves a registered setting state and performs a job, if a default value has been changed, he may not have desired results.

For example, copying may be handled as follows. Suppose, when a setting state is registered, the default value for the setting item "double-side printing" is "double-side printing disabled (Off)", and thus this setting value is registered. Later, due to a change in corporate guidelines or the like, the default value for double-side printing is changed to "double-side printing enabled (On)". On the other hand, when a setting state is retrieved and copying is performed, the setting state is restored based on the setting values for all the setting items at the time of registration. After retrieval of the setting state, performing printing yields a printout with double-side printing disabled. This is an unintended (undesirable) result for a user who wants to obtain a printout with double-side printing enabled (a user who wants to an output according to current default values). The user has no sense of having set a setting item which had been registered with the default value. Thus, after retrieving a setting state, the user does not feel a necessity to confirm a setting item for which the default value has been changed. On the other hand, a user may occasionally wants an output to which the default value before change is applied. Thus, it is not desirable to apply current default values to setting items that have been registered with default values.

Incidentally, in the well-known image forming apparatus mentioned above, it is unclear how a change that is made in a default value after registration of a setting state is coped with. Thus, no solution to the above-mentioned inconvenience is obtained.

SUMMARY

According to one aspect of the present disclosure, a display/input device includes a display panel, an input portion, a storage portion, and a control portion. The display panel performs display. The input portion accepts input by a user. The storage portion stores current value data which contains a current setting value for a setting item; default value data which contains a default value of a setting value for a setting item; and saved setting data which, when retrieved, is used to restore a setting state and which contains a setting value for a setting item at a time of registration thereof and data indicating whether or not a setting value is a setting value changed from a setting value for a setting item at the time of registration thereof. The control portion tries, when an operation for retrieving saved setting data is made on the input portion, to extract, out of the setting value in the retrieved saved setting data, a setting value that has been registered without being changed from a default value at the time of registration of the saved setting data and that differs from a current default value. The control portion then, when no setting value is extracted, writes the setting value in the saved setting data to the current value data, thereby to restore the setting state at the time of registration of the saved setting data and, when any setting value is extracted, displays, on the display panel, a value of the extracted setting value at the time of registration thereof along with the current default value, then writing, out of the value of the extracted setting value at the time of registration thereof and the current default value, a value which is selected by the user through the operation on the input portion to the current value data, and writing, for a setting value other than the extracted setting value, the setting value in the saved setting data to the current value data.

Further features and advantages of the present disclosure will become apparent from the description of embodiments given below.

DETAILED DESCRIPTION

According to the present disclosure, after a setting state (data of saved setting values) is registered, even if a default value is changed, a job executed with the retrieved setting state yields an output as desired by the user. Now, with reference to FIGS. 1 to 14, an embodiment of the present disclosure will be described. The following description deals with, as an example, a multifunction peripheral (MFP) 100 (corresponding to an image forming apparatus). None of the features of the embodiment in terms of structure, arrangement, etc. is meant to restrict the scope of the present disclosure; they are all merely illustrative.

(Outline of an Image Forming Apparatus)

Figure 1:
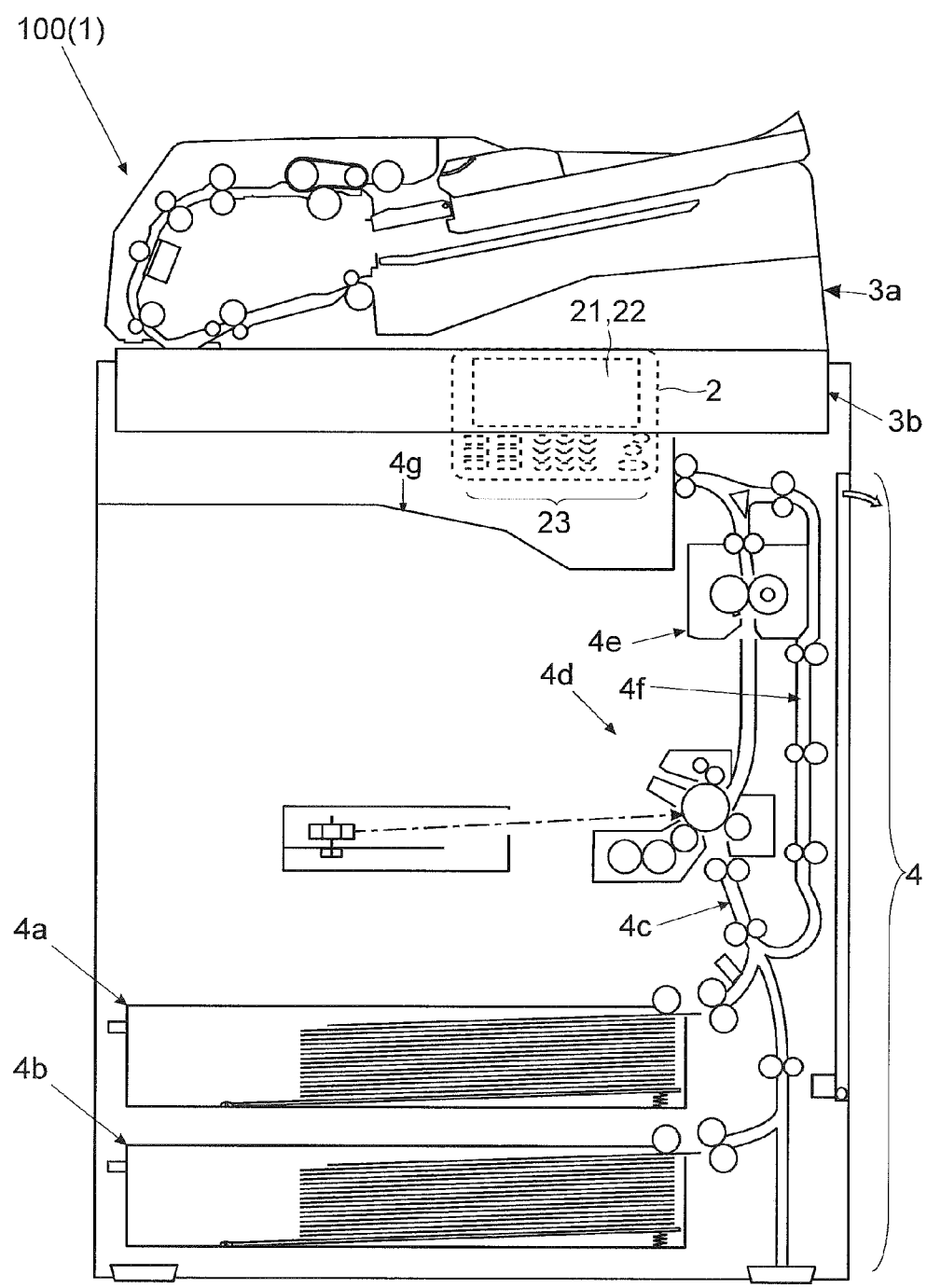
FIG. 1 is a diagram showing an example of a multifunction peripheral according to one embodiment.

First, with reference to FIG. 1, an outline of a multifunction peripheral 100 embodying the present disclosure will be described. As shown in FIG. 1, on the front face of the multifunction peripheral 100, an operation panel 2 (indicated by broken lines) is provided. In a top part, a document transport portion 3a and an image reading portion 3b are provided. Inside the multifunction peripheral 100, a printing portion 4 for performing printing (a first sheet feed portion 4a, a second sheet feed portion 4b, a transport portion 4c, an image forming portion 4d, a fixing portion 4e, and a double-side transport portion 4f) is provided.

The operation panel 2 includes a display panel 21 which displays the status of the multifunction peripheral 100, various messages, and various setting screens. On the top face of the display panel 21, a touch panel portion 22 (corresponding to an input portion) is provided. The touch panel portion 22 detects the position, or coordinates, of a part of the display panel 21 being pressed (operated). Based on an output from the touch panel portion 22, a pressed (operated) button or key (soft key) is identified. On the operation panel 2 are also provided a plurality of hardware keys 23 (corresponding to an input portion) including a Start key and a numerical keypad.

The document transport portion 3a automatically transports, out of a document set, one sheet after another toward a feed-reading contact glass (reading position; unillustrated). The image reading portion 3b reads a document passing across the feed-reading contact glass, or a document set on a stationary-reading contact glass (unillustrated), to produce image data.

The first and second sheet feed portions 4a and 4b can each contain a plurality of sheets. When a print job is executed, either the first or second sheet feed portion 4a or 4b feeds one sheet after another into the transport portion 4c. The transport portion 4c transports a sheet fed from the first or second sheet feed portion 4a or 4b. The image forming portion 4d forms a toner image based on image data, and transfers the toner image to the sheet being transported. The fixing portion 4e fixes the toner image transferred to the sheet. The sheet having toner fixed to it is discharged onto a discharge tray 4g. In double-side printing, the double-side transport portion 4f transports a sheet printed on one side back to the upstream side of the image forming portion 4d.

(Hardware Configuration of the Multifunction Peripheral 100)

Figure 2:
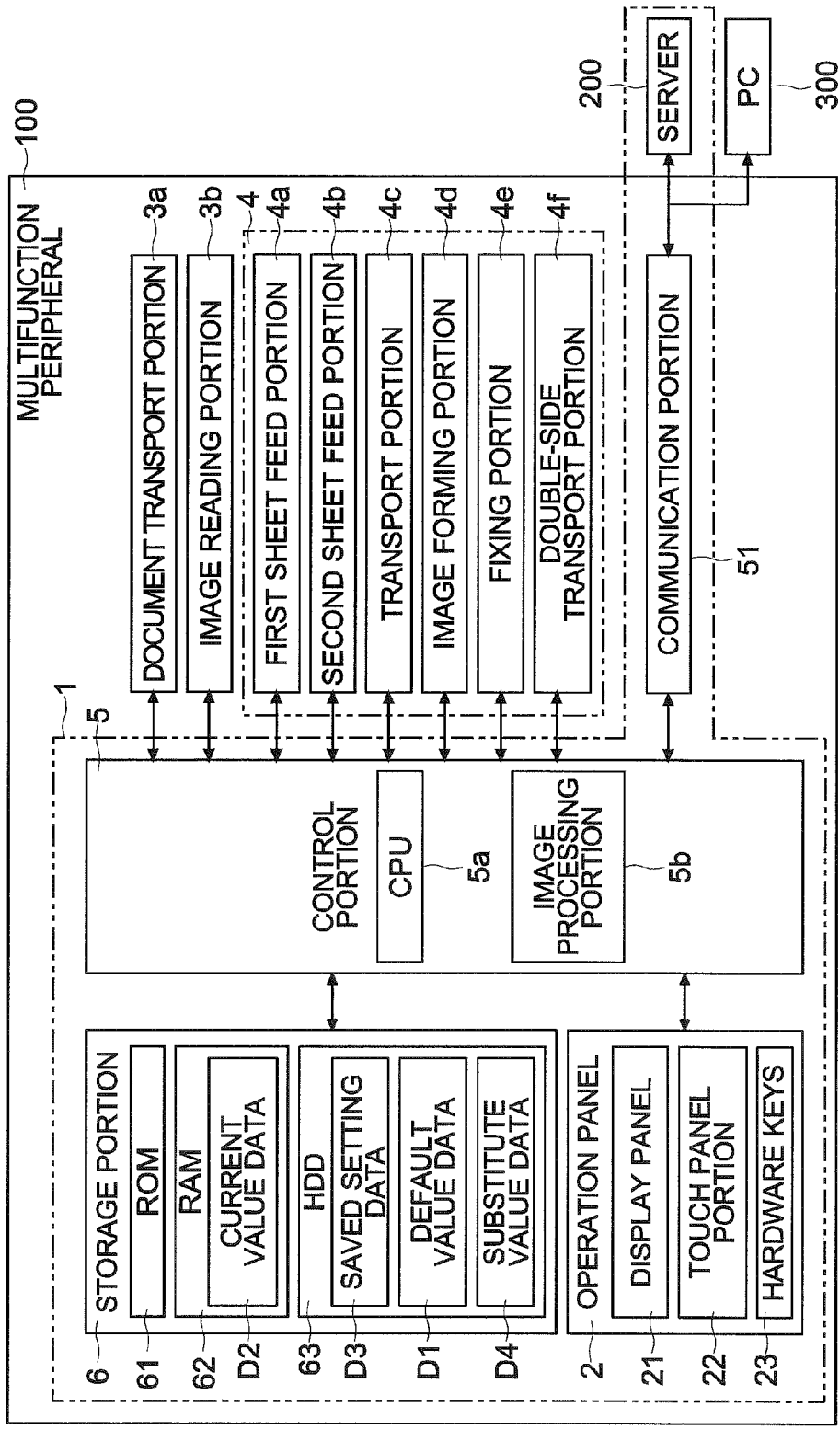
FIG. 2 is a diagram showing one example of a configuration of a multifunction peripheral according to one embodiment.

Next, with reference to FIG. 2, an example of the hardware configuration of the multifunction peripheral 100 according to the embodiment will be described. The multifunction peripheral 100 includes a control portion 5 (see FIG. 2). The control portion 5 controls the operation of the image forming apparatus. The control portion 5 includes a CPU 5a and circuitry such as an image processing portion 5b. There can be provided separate control portions divided on a function-by-function basis, such as a main control portion for overall control and image processing and an engine control portion for controlling printing.

The CPU 5a controls different parts of the image forming apparatus, and performs various kinds of data processing, based on programs and data stored in a storage portion 6. The image processing portion 5b processes image data. For example, the image processing portion 5b can perform image processing on image data to be printed, to achieve density conversion, enlargement, reduction, etc., and can perform format conversion and the like on image data read by the image reading portion 3b. The processed image data is used in toner image formation in the image forming portion 4d and for image transmission. The storage portion 6 includes ROM 61, RAM 62, and a HDD 63. The storage portion 6 stores programs and data for controlling the multifunction peripheral 100 and various kinds of data such as setting data and image data.

The control portion 5 controls what is displayed on the operation panel 2. Based on outputs from the touch panel portion 22 and the hardware keys 23, the control portion 5 recognizes what is entered on the operation panel 2 (keys and tabs being operated). The control portion 5 also recognizes setting values set on the operation panel 2. Thus, the control portion 5 and the storage portion 6 are involved in the operation of the operation panel 2. Thus, a display/input device 1 according to the embodiment is composed of the display panel 21, the touch panel portion 22, the hardware keys 23, the storage portion 6, and the control portion 5 (and as necessary it can further include a communication portion 51 and a server 200).

The operation panel 2 can include a panel control portion which recognizes setting operation by a user and which makes the display panel 21 switch screens according to the setting operation. In a case where a panel control portion is provided, the control portion 5 receives from the panel control portion data conveying the settings made by the user, and gives the panel control portion instructions for actions to be performed and screens to be displayed.

The control portion 5 is connected to a communication portion 51 which includes various connectors, sockets, and communication control chips. The communication portion 51 is communicably connected, across a network, public telephone line, or cable, to a server 200 or a PC 300. The communication portion 51 can exchange various kinds of data with the computer.

The control portion 5 is connected to different parts, such as the operation panel 2, the document transport portion 3a, the image reading portion 3b, the printing portion 4, and the communication portion 51, across a bus and signal lines. The control portion 5 recognizes the presence of those and other parts and devices. By controlling such parts and devices, the control portion 5 controls the operation of the multifunction peripheral 100 to perform scanning and printing.

(Setting on the Operation Panel 2)

Next, with reference to FIGS. 3 to 5, an example of setting on the multifunction peripheral 100 according to the embodiment will be described. The display panel 21 on the operation panel 2 can display various setting screens. The control portion 5 makes the display panel 21 switch screens according to operation performed with software keys provided in setting screens and hardware keys 23 arranged on the operation panel 2.

Figure 3:
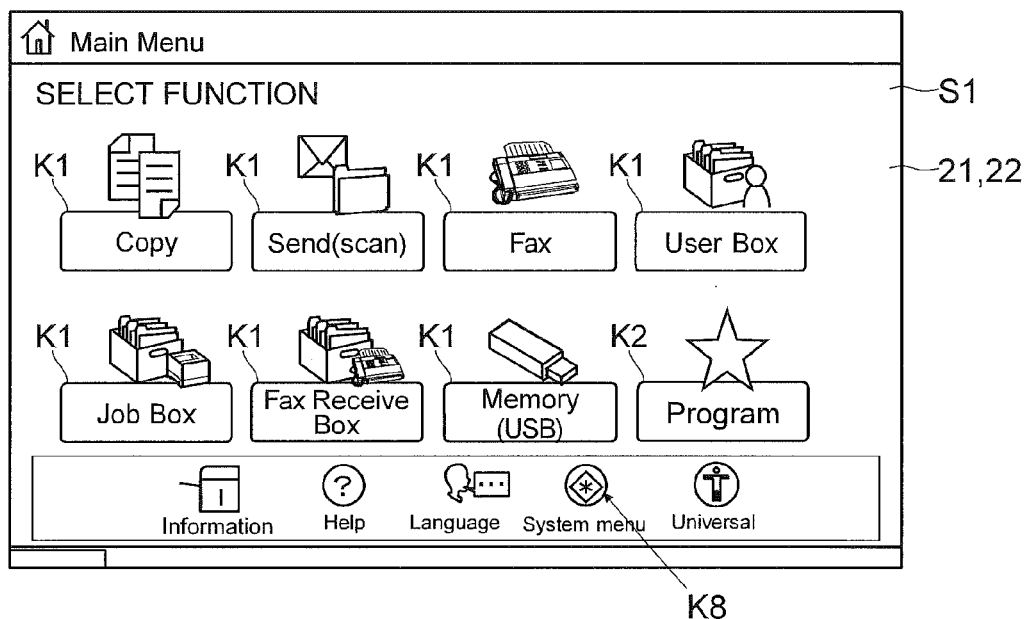
FIG. 3 is a diagram showing one example of a main menu screen according to one embodiment.
Figure 4:
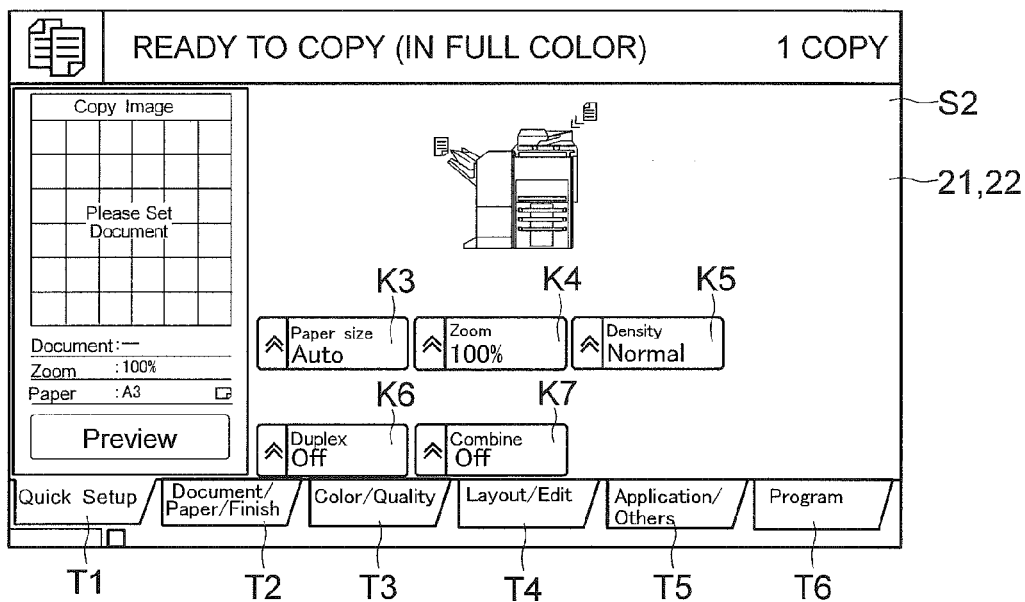
FIG. 4 is a diagram showing one example of a copy setting screen displayed first when copying is selected as a job.

FIG. 3 shows a main menu screen S1, which is the highest screen in hierarchy. The main menu screen S1 is a screen that allows selection of a kind of job to be executed and a setting category. In an upper part of the main menu screen S1, seven job select keys K1 are arranged which are marked with icons (images) indicating selectable kinds of job. Touching the display position of one of the job select keys K1 allows selection of a particular kind of job, such as copying, scan-and-send, etc. Based on an output from the touch panel portion 22, the control portion 5 makes the display panel 21 display a setting screen corresponding to the touched job select key K1. What occurs when a Program key K2 is operated will be discussed in detail later. In a lower part of the main menu screen S1, a group of system-related keys are arranged which will be involved in system setting (setting that relates to the overall operation of the multifunction peripheral 100, setting that does not involve execution of a job).

Next, with reference to FIG. 4, one example of a setting screen displayed in response to selection of a kind of job will be described. FIG. 4 shows a copy setting screen S2, which is the first screen displayed when copying is selected as a kind of job (when the job select key K1 for copying is operated). The copy setting screen S2 is one of setting screens related to copying. For each of other kinds of job, there are provided setting screens related to it; however, in the following description, no specific description will be given of setting screens other than those related to copying.

The copy setting screen S2 is displayed, at first, in a state where a Quick Setup tab T1 (a tab with the character string "Quick Setup") is selected. In the state where the Quick Setup tab T1 is selected, the control portion 5 makes the display panel 21 display those setting keys which have been set as frequently used keys by default, or those setting keys which have been selected by a user. FIG. 4 shows an example where, in the state where the Quick Setup tab T1 is selected, there are arranged item selection keys K3, K4, K5, K6, and K7 corresponding to "Paper size", "Zoom (enlargement/reduction)", "Density (printing density)", "Duplex", and "Combine (combined printing)" respectively.

When the display position of any of the item selection keys K3 to K7 is touched, the control portion 5 makes the display panel 21 display a screen that allows setting of a setting value for the setting item selected by the touch. For example, when the setting item "Combine" is selected, a screen is displayed that allows determination of a setting value as to the number of pages to be combined in a single pages, such as "2 in 1" and "4 in 1".

To set a setting item that is not displayed in the copy setting screen S2 (out of many setting items including, e.g., frame erasure, margin setting, read resolution setting, and document size setting), a user first touches the display position of one of the tabs arranged in the same row as the quick setup tab T1, namely a Document/Paper/Finish tab T2, a Color/Quality tab T3; a Layout/Edit tab T4, and an Application/Others tab T5. Each setting item is associated with one of the tabs T2 to T5. The control portion 5 makes the display panel 21 display a list of setting items associated with the tab of which the display position has been touched, and displays on the display panel 21 a screen that allows selection of a setting item.

For example, when the display position of the Document/Paper/Finish tab T2 is touched, the control portion 5 makes the display panel 21 display a screen that allows selection of a setting item related to documents and sheets, such as document/sheet size, document/sheet orientation, and sheet feed source. Thus, through operation on the copy setting screen S2, a user can have displayed a screen for selection of a setting item and a screen for setting a setting value for the selected setting item. By operating the operation panel 2, the user sets a setting value that will yield desired results.

(Default Value)

Next, with reference to FIGS. 3 and 5, a description will be given of default values of setting values for different setting items. For each setting item that can be set on the operation panel 2, a default value (initial value) is prescribed. For example, when copying is selected as a kind of job (function), and the copy setting screen S2 is displayed for the first time, default values are shown as setting values of setting items. The ROM 61 and the HDD 63 in the storage portion 6 store, on a non-volatile basis, default value data D1 in which default values of setting values for setting items are defined.

Figures 5, 6:
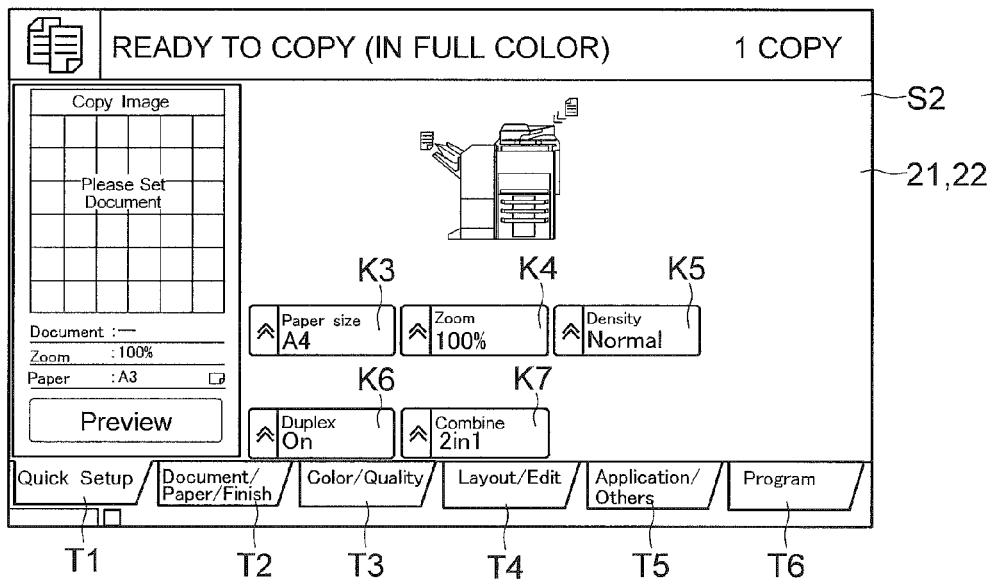
FIG. 5 is a diagram showing one example of default value data according to one embodiment.
FIG. 6 is a diagram showing one example of a state after setting as to a copy job.

FIG. 5 shows an example of the default value data D1 which contains default values for setting items related to copying. A setting item for which a setting value is either On or Off (whether to enable or disable the setting item), the default value is typically OFF. On the other hand, for a setting item, such as density or magnification, for which a setting value is not simply either On or Off but one selected from a plurality of levels, the default value is typically a setting value that is most frequently used on an empirical basis. For example, as to a copying function, the default value for the setting item "density" is "normal", and the default value for the setting item "magnification" is "100%".

When the Start key is pressed with no change made in setting values, the control portion 5 takes default values as setting values for all setting items, and makes those parts which execute jobs, such as the printing portion 4, the image reading portion 3b, and the communication portion 51, execute jobs accordingly.

The control portion 5 makes the storage portion 6 store current value data D2 (see FIG. 2) which contains current setting values for setting items. The current value data D2 is stored in a predetermined storage area in the RAM 62. When a job to be executed is selected, and a setting screen for the selected job is displayed for the first time, the control portion 5 reads the default value data D1 from the ROM 61 and the HDD 63 to the RAM 62. The control portion 5 then writes default values into the current value data D2. For example, when copying is selected, and the copy setting screen S2 is displayed for the first time, the control portion 5 writes, out of the default value data D1, that part which corresponds to setting items related to copying into the current value data D2. That is, initially, the current value data D2 is identical with the default value data D1.

When a user changes a setting value from its default value, the control portion 5 makes the storage portion 6 update, out of the current value data D2, the setting value for the changed setting item from the default value to the changed value (updating of the current value data D2). Each time a setting value for a setting item such as magnification, density, or double-side copying is changed, the control portion 5 changes, in the current value data D2, the value for the changed setting item to the changed value. When an instruction to execute a job is entered (when the Start key is pressed), the control portion 5 makes those parts which execute jobs, such as the printing portion 4, the image reading portion 3b, and the communication portion 51, execute jobs according to the setting values for the relevant setting items contained in the current value data D2.

Due to corporate guidelines, or out of other necessity, the prescribed default setting value for a setting item may have to be changed. In such cases, on the operation panel 2, the default value for a setting item can be changed. To change a default value, a user first operates a system menu key K8 on the main menu screen S1. In response, the control portion 5 makes the display panel 21 display a system menu screen (unillustrated). On the system menu screen, a user can, by selecting a kind of job, selecting a setting item for which the user wants to change the default value, and entering the changed default value, change the default value for the selected setting item. Thus, the input portion (the touch panel portion 22 and the hardware keys 23) accepts an input for selecting a setting item and an input for changing the default value for the selected setting item. In response to the touch panel portion 22 accepting an input for changing a default value, the control portion 5 makes the storage portion 6 update, out of the default value data D1, the default value for the corresponding setting item. In other words, in response to an input for changing a default value, the control portion 5 makes the storage portion 6 update the default value data D1 such that it reflects the changed value. In this way, it is possible to select any setting item and change the default setting value for the selected setting item to a desired value.

(Registering Saved Setting Data D3)

Next, with reference to FIGS. 6 to 9, a description will be given of registration of saved setting data D3. As described above, with the operation panel 2 and the multifunction peripheral 100, a user can select a setting item provided for a kind of job to be executed and set a setting value that will yield desired results.

FIG. 6 shows an example of the copy setting screen S2 after a user has performed setting. Compared with FIG. 4, in FIG. 6, a setting value as to paper size has been changed from "Auto" to "A4", a setting value as to double-side printing has been changed from "Off" to "On", and a setting value as to combined printing has been changed from "Off" to "2 in 1".

In a situation where a user performs copy jobs frequently with a particular combination of a plurality of setting items, it would be convenient when he can save (register) a setting state so that he can later restore the setting state as it was at the time of registration simply by retrieving the saved setting state. This saves the user the trouble of habitually selecting particular setting items and setting particular setting values every time he performs a copy job. To that end, with the operation panel 2 and the multifunction peripheral 100 according to the embodiment, a user can register a setting state as saved setting data D3. A set of saved setting data D3 is occasionally called a "program", and a function that allows registration of a setting state a "program function".

To register a setting state, a user first sets a desired setting value, and then touches a Program tab T6 (see FIGS. 4 and 6) shown on each setting screen. On recognizing the operation on the Program tab T6 based on an output from the touch panel portion 22, the control portion 5 makes the display panel 21 display a program retrieval screen S3 (see FIG. 7). The program retrieval screen S3 allows registration and retrieval of a setting state (saved setting data D3).

On the program retrieval screen S3, a Register key K9 and an Edit key K10 are displayed. The Register key K9 is operated for registration of a new setting state. The Edit key K10 is operated for editing of the content of a registered setting state (saved setting data D3).

On recognizing the operation on the Register key K9 based on an output from the touch panel portion 22, the control portion 5 starts registration of saved setting data D3. In other words, the input portion (the touch panel portion 22 and the hardware keys 23) accepts an input for selecting an setting item, an input for setting a setting value for the selected setting item, and a registration input for requesting registration of new saved setting data D3. Now, with reference to FIGS. 8 and 9, a procedure for registration of saved setting data D3 will be described.

Figures 8, 9:
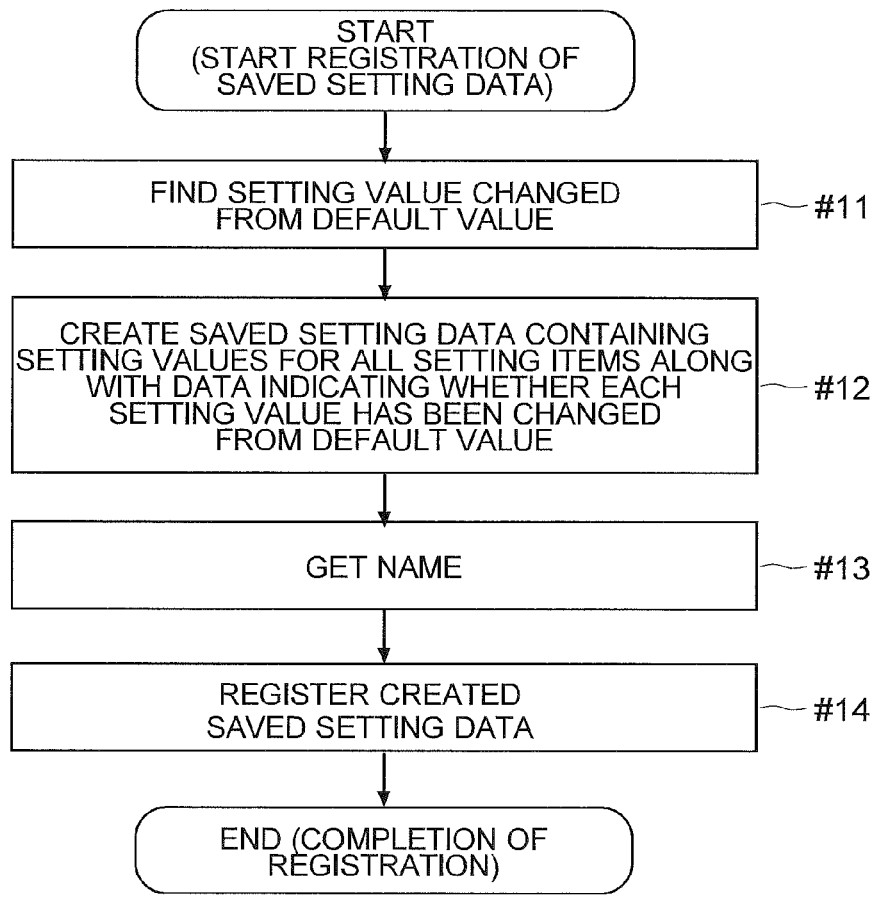
FIG. 8 is a flow chart showing an example of a procedure for registration of saved setting data according to one embodiment.
FIG. 9 is a diagram showing one example of saved setting data according to one embodiment.

The procedure shown in a flow chart in FIG. 8 starts when the Register key K9 is operated. At this point, the user has set, on the operation panel 2, a setting value that he wants to register (a setting value has already been set).

Based on the current value data D2, the control portion 5 identifies a setting value changed from a default value (Step #11). Subsequently, based on the current value data D2 and the result of Step #11, the control portion 5 creates saved setting data D3 which contains setting values for all setting items provided for a given kind of job and which also contains data indicating whether the setting value of any setting item has been changed from the default value (Step #12).

The current value data D2 contains setting values that are currently set for setting items. To save a current setting state, the control portion 5 first copies the current value data D2 to create part of saved setting data D3. Created using the current value data D2, the saved setting data D3 contains setting values for all setting items provided for the selected kind of job. In the saved setting data D3, for a setting item for which there have been a change from the default value, the changed setting value is defined as the setting value, and for a setting item for which there have been no change from the default value, the default value is defined as the setting value. Moreover, the control portion 5 adds to the saved setting data D3 data indicating, for each setting item, whether or not its setting value has been changed from the default value.

Subsequently, the control portion 5 recognizes input of the name of the saved setting data D3 (program) to be registered (Step #13). Here, the control portion 5 makes the display panel 21 display a screen for entry of a name and recognizes the entered name based on an output from the touch panel portion 22.

On completion of entry of a name on the screen for entry of a name, the control portion 5 have the saved setting data D3 stored in a non-volatile storage area such as the HDD 63 or the RAM 62 in the storage portion 6 (Step #14 to End). In other words, in response to the input portion accepting a registration input, the control portion 5 stores, as the saved setting data D3, the current value data D2 in the storage portion 6 (including a server 200). In this way, saved setting data D3 is created, and is registered as data to be retrieved later. That is, a user can register, as saved setting data D3, a state in which setting values are so set as to yield desired results (output). The control portion 5 can not only have the saved setting data D3 stored in the storage portion 6 but also transmit the created saved setting data D3 from the communication portion 51 to a server 200, which will be described later. In this way, the created saved setting data D3 can be stored in the server 200 as well.

FIG. 9 shows an example of registered saved setting data D3. In the registered saved setting data D3, each setting item is associated with a setting value and data (a bit) indicating whether or not there has been a change from the default value. For a copying function, saved setting data D3 containing all setting items as to copying is registered, and for a transmission function, saved setting data D3 containing all setting items as to transmission is registered.

(Retrieving Saved Setting Data D3)

Figure 7:
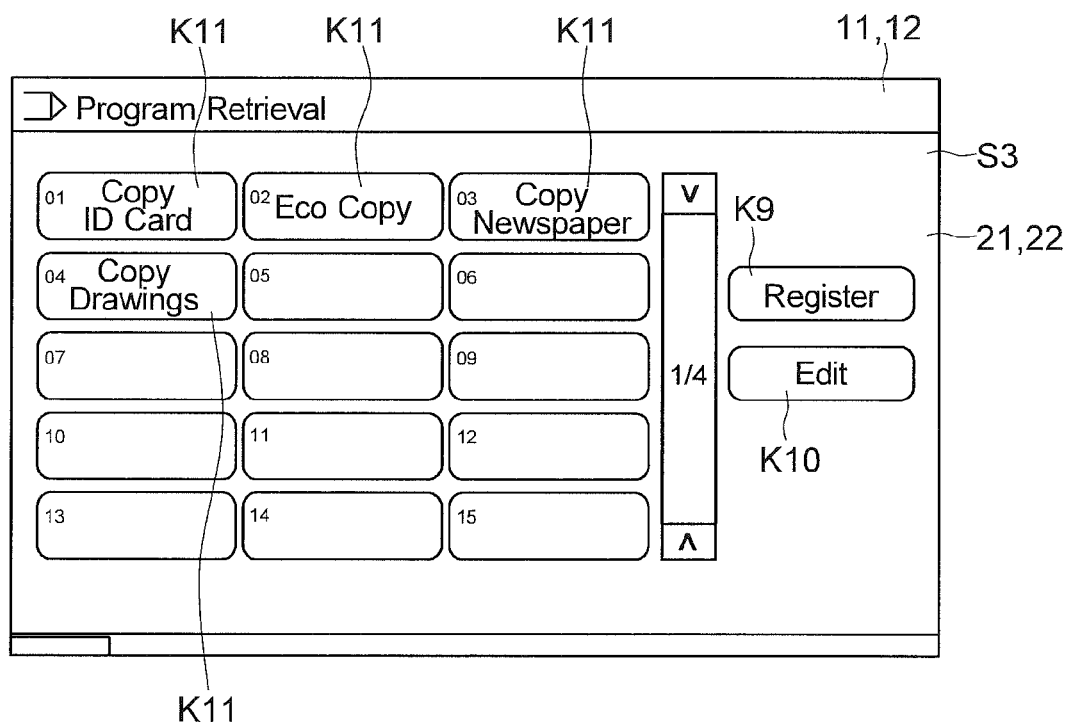
FIG. 7 is a diagram showing an example of a program retrieval screen according to one embodiment.
Figure 10:
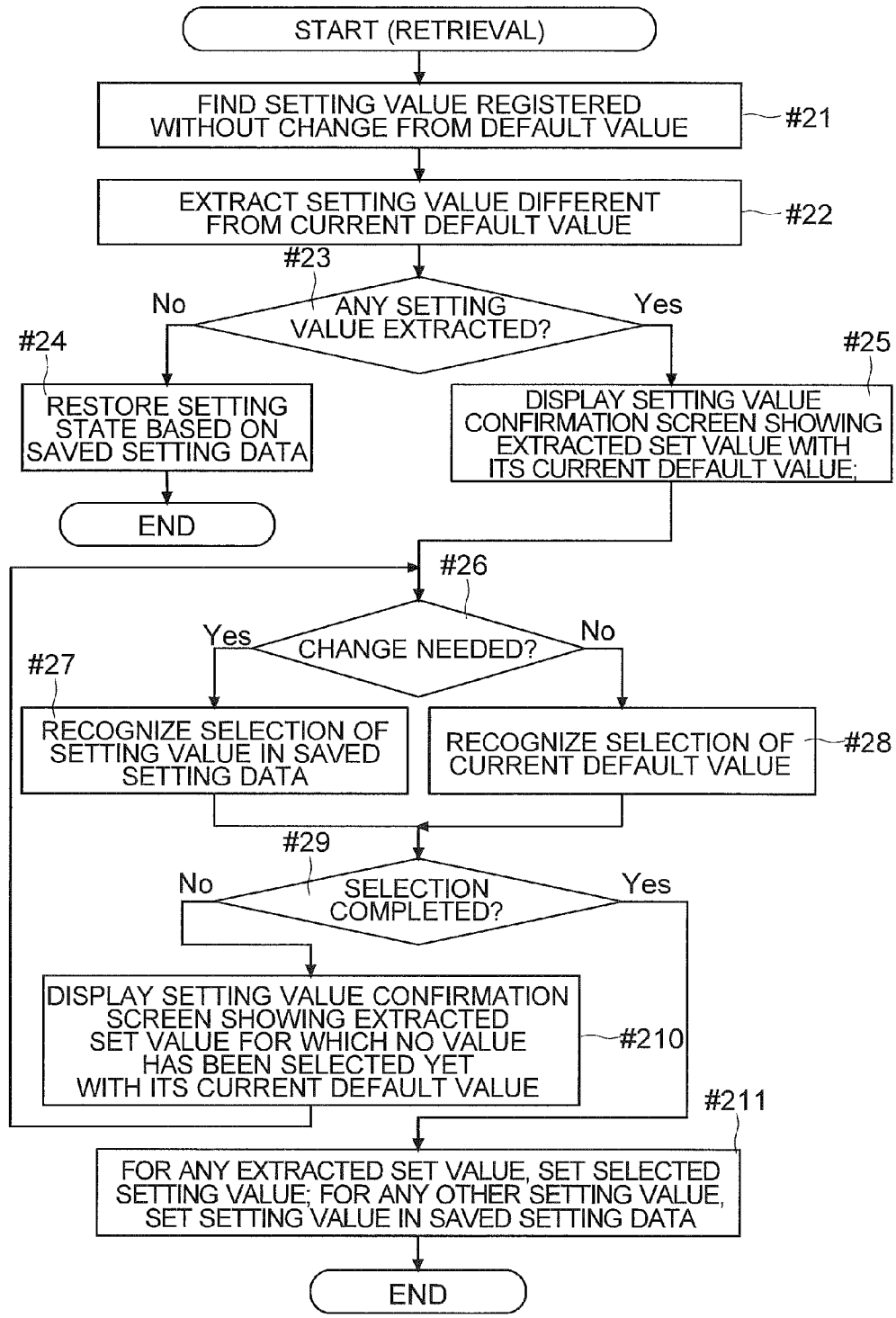
FIG. 10 is a flow chart showing one example of a procedure for retrieval of saved setting data according to one embodiment.

Next, with reference to FIGS. 7, 10, and 11, a description will be given of retrieval of saved setting data D3. With the operation panel 2 and the multifunction peripheral 100, a user can retrieve a saved setting state simply by retrieving registered saved setting data D3 (program). To retrieve saved setting data D3, the user has to have the program retrieval screen S3 (see FIG. 7) displayed. As described previously, after selecting a kind of job, a user can, by operating the Program tab T6 shown on a setting screen like the operation panel 2, display the program retrieval screen S3. Also by operating the Program key K2 arranged on the main menu screen S1 (see FIG. 3), a user can display the program retrieval screen S3.

In the program retrieval screen S3, a plurality of retrieval keys K11 are arranged. These retrieval keys K11 bear serial numbers. In the example shown in FIG. 7, only those retrieval keys K11 for which corresponding D3 exists are identified by reference signs. The control portion 5 makes the display panel 21 display, inside the retrieval keys K11, the names of the corresponding saved setting data D3 (programs). Newly registered saved setting data D3 is assigned a blank (as yet unnamed) retrieval key K11. The name of the newly registered saved setting data D3 will appear inside the retrieval key K11 that has been blank.

To retrieve saved setting data D3, a user operates the corresponding retrieval key K11. On recognizing the operation on the retrieval key K11 based on an output from the touch panel portion 22, the control portion 5 recognizes a request for retrieval of the saved setting data D3 corresponding to the retrieval key K11.

Next, with reference to FIG. 10, an example of a procedure subsequent to a request for retrieval of saved setting data D3 will be described. The procedure shown in a flow chart in FIG. 10 starts when the control portion 5 recognizes a request for retrieval of saved setting data D3 based on an output from the touch panel portion 22.

First, the control portion 5 identifies, out of all setting values in the retrieved saved setting data D3, any that has been registered with no change from the default value (Step #21). The control portion 5 then extracts, out of any setting value that has been registered with no change from the default value, any that differs from the current default value (Step #22). Based on the results of Steps #21 and #22, the control portion 5 then checks whether any setting value has been extracted at all (Step #23). When no setting value has been extracted (Step #23, No), the control portion 5 writes the setting values defined in the saved setting data D3 into the current value data D2, and thereby restores the setting state at the time of registration of the saved setting data D3 (Step #24 to End).

On the other hand, when any setting value has been extracted (when any setting value has been extracted that fulfills both the conditions of Steps #21 and #22; Step #23, Yes), the control portion 5 makes the display panel 21 display a setting value confirmation screen S4 that shows the extracted setting value and the current default value (Step #25). When a plurality of such setting values have been extracted, the control portion 5 makes the display panel 21 display one of the extracted setting values along with the current default value corresponding to it.

Figure 11:
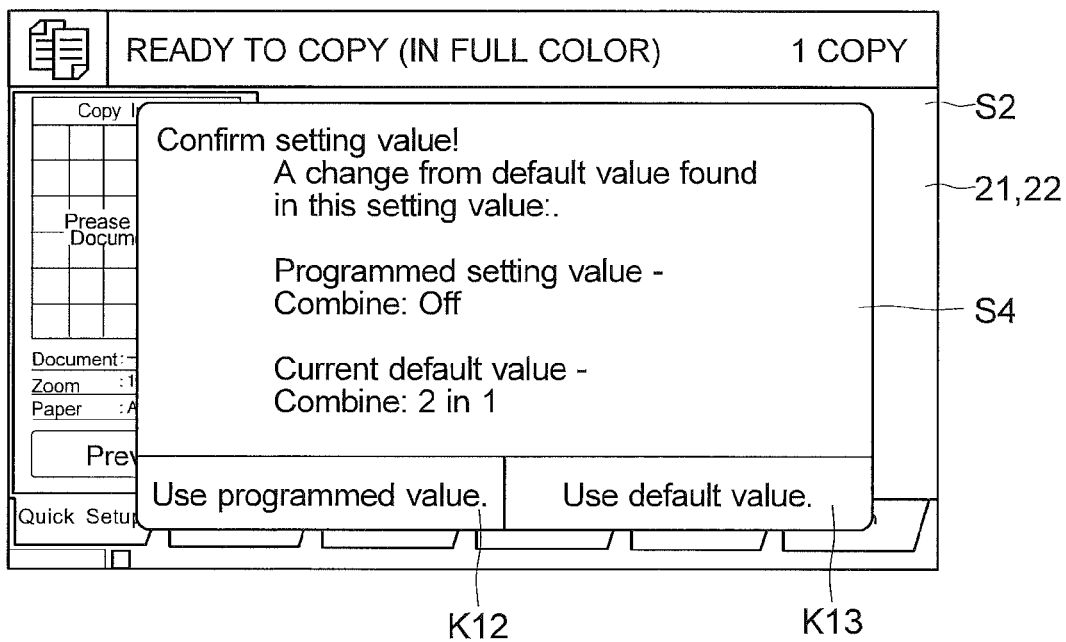
FIG. 11 is a diagram showing one example of a setting value confirmation screen according to one embodiment.

FIG. 11 shows an example of the setting value confirmation screen S4 displayed when saved setting data D3 related to a copy job has been retrieved. As shown in FIG. 11, the control portion 5 makes the display panel 21 display the setting value confirmation screen S4 such that it shows one extracted setting value and one current default value. FIG. 11 shows an example where, for the setting item "combined printing", the setting value "Off (no combined printing)" has been registered with no change made from the default value at the time of registration of saved setting data D3, whereas the current default value is "2 in 1".

Consider a case where a user has registered saved setting data D3 without changing the default value "Off" as to combined printing. Then, setting values for all setting items are registered as saved setting data D3. Thus, as to combined printing, the default value "Off" is registered. After registration of the saved setting data D3, due to corporate guidelines in favor of "reduced consumption of sheets and toner", an administrator may operate the operation panel 2 to change the default value as to combined printing to "2 in 1".

Conventionally, after a default value is changed, performing a copy job with retrieved saved setting data D3 results in the setting values in the saved setting data D3 being reflected as they are. Thus, an uncombined printout (in which no combining together of a plurality of pages into a single page is effected) is obtained. This is an unintended output result for a user who wants to obtain a combined printout.

In such a case, to obtain a desired output, the user has to retrieve the saved setting data D3 and then re-set a setting item for which the default value has been changed. Unfortunately, a user may remember well a setting value which he has changed from the default value, but hardly a setting value which he has not changed from the default value. Thus, a user tends to perform a job without re-setting. On the other hand, a user may occasionally want to obtain a job output that reflects a default value before change. Thus, it is undesirable to automatically substitute the changed default value without consent. As a solution, the operation panel 2 and the multifunction peripheral 100 have the setting value confirmation screen S4 displayed. On the setting value confirmation screen S4, a no-change key K12 and a use-default-value key K13 are arranged. When a user chooses to use as an extracted setting value a setting value defined in saved setting data D3, he operates the no-change key K12. On the other hand, when a user chooses to use as an extracted setting value the current default value, he operates the use-default-value key K13.

The control portion 5 checks whether or not the no-change key K12 is operated (Step #26). On recognizing that the no-change key K12 is operated based on an output from the touch panel portion 22 (Step #26, Yes), the control portion 5 recognizes that the setting value in the saved setting data D3 is selected (Step #27). On the other hand, when the use-default-value key K13 is operated (Step #26, No), the control portion 5 recognizes that the current default value is selected (Step #28).

Then, the control portion 5 checks whether or not values have been selected for all extracted setting values (Step #29). When there is any extracted setting value for which no value has been selected yet (step #29, No), the control portion 5 makes the display panel 21 display another selling value confirmation screen S4 showing one of those extracted setting values for which no values have been set yet and the current default value for the thus displayed extracted setting value (Step #210).

When values have been selected for all extracted setting values (Step #29, Yes), the control portion 5 modifies the setting state of the operation panel 2 such that, for extracted setting values, the selected setting values are set and that, for setting values other than extracted setting values, the setting values in the saved setting data D3 are set (Step #211 to End). In other words, the control portion 5 writes, for extracted setting values, selected settings and, for setting values other than extracted setting values, setting values in the saved setting data D3 into the current value data D2.

(Retrieval of Saved Setting Data D3 Registered on Another Image Forming Apparatus)

Figure 13:
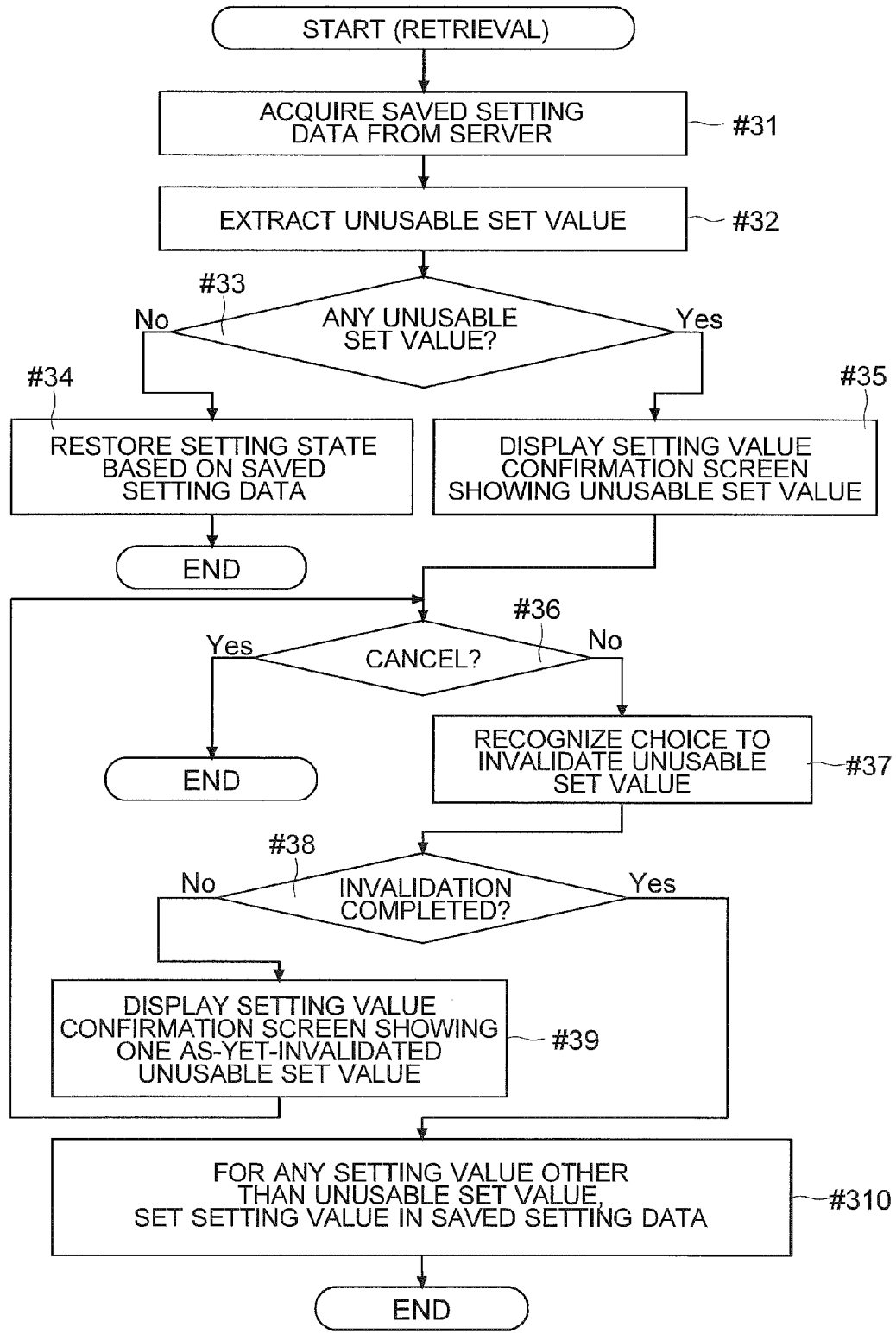
FIG. 13 is a flow chart showing one example of a procedure for retrieval of saved setting data registered on another image forming apparatus.
Figure 14:
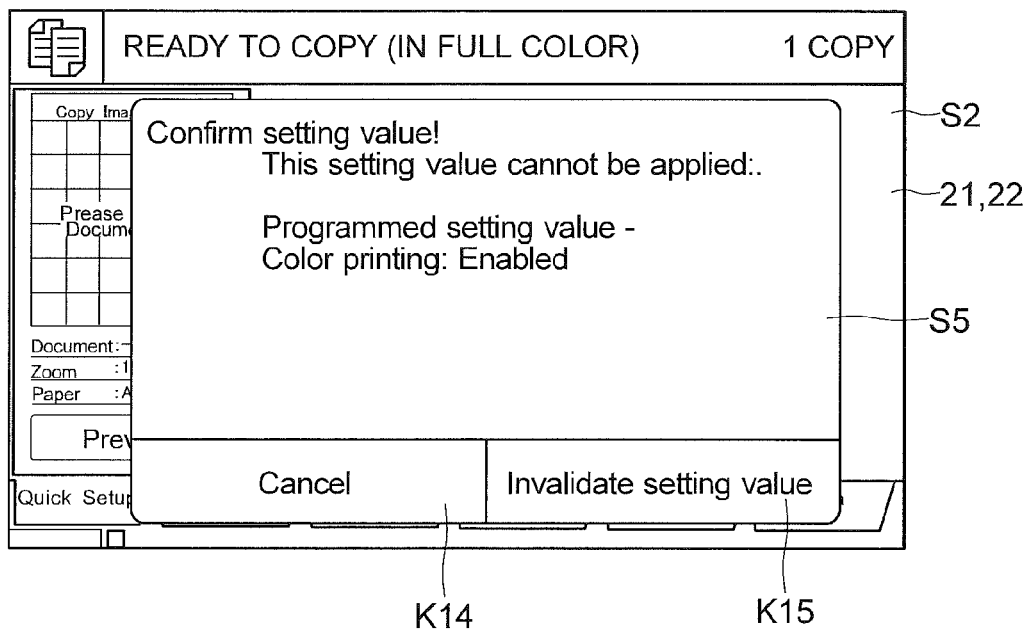
FIG. 14 is a diagram showing one example of a setting value confirmation screen according to one embodiment.

Next, with reference to FIGS. 12 to 14, a description will be given of retrieval of saved setting data d3 registered on another image forming apparatus. Simply by retrieving saved setting data D3, setting values for a plurality of setting items can be set at desired values. Saved setting data D3 can be registered in the multifunction peripheral 100 (display/input device 1). When saved setting data D3 can be shared among a plurality of image forming apparatuses, it is possible to save the trouble of registering the same saved setting data D3 in a plurality of image forming apparatuses. Accordingly, saved setting data D3 registered in different image forming apparatuses can be stored in a server 200 (a data server within a local network) accessible from those image forming apparatuses.

Figure 12:
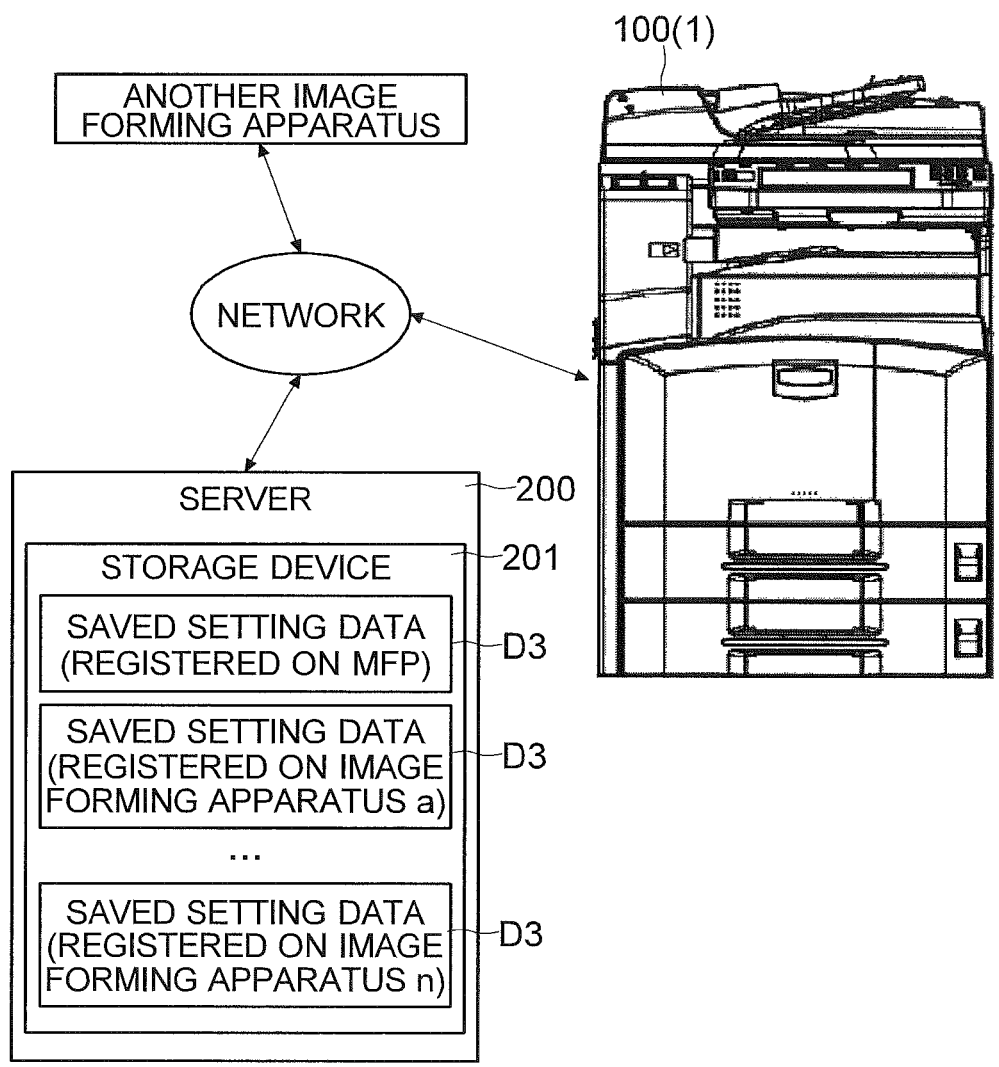
FIG. 12 is a diagram showing one example of how saved setting data from different image forming apparatuses is stored in a server.

The server 200 includes a large-capacity non-volatile storage device 201 such as a HDD (see FIG. 12). The server 200 is communicably connected over a network to the communication portion 51 of the multifunction peripheral 100 and to another image forming apparatus. As shown in FIG. 12, the server 200 receives from each image forming apparatus saved setting data D3 (setting state) registered in it. The storage device 201 in the server 200 stores the received saved setting data D3. In this way, from the perspective of sharing saved setting data D3, saved setting data D3 registered in different display/input devices 1 (different image forming apparatuses) are often stored in an external storage portion 6 such as a server 200. Thus, the multifunction peripheral 100 (communication portion 51) can access the server 200 and acquire saved setting data D3 registered in another image forming apparatus. In other words, the multifunction peripheral 100 (the display/input device 1 being used) can retrieve saved setting data D3 registered in another image forming apparatus (display/input device 1).

However, the image forming apparatus (multifunction peripheral 100) is not always the same model as another image forming apparatus. Saved setting data D3 registered in another image forming apparatus may include a setting value for a setting item that is not available (implemented) on the retrieving-side image forming apparatus. This is conventionally handled as a format mismatch (improper form) error in saved setting data D3. This sometimes prevents use of saved setting data D3 registered in another image forming apparatus.

For example, consider a case where, for an image forming apparatus capable of color printing, saved setting data D3 in which a setting value for a setting item related to color printing is "On" is registered in the server 200. Then, without a user turning color printing On, so long as the default value for color printing is "On", saved setting data D3 in which a setting value for color printing is "On" is registered in the server 200.

When an image forming apparatus capable only of black-and-white printing (image forming apparatus incapable of color printing) accesses the server 200 and retrieves saved setting data D3 in which the setting value for color printing is On, the retrieving-side monochrome image forming apparatus has no setting item related to color printing at all. A model compatible with color printing may have a plurality of setting items related to color printing, such as color balance, hue adjustment, and saturation adjustment. To a monochrome image forming apparatus, a setting value for a setting item related to color printing cannot be applied. Thus, conventionally, a monochrome image forming apparatus cannot use saved setting data D3 that includes a setting value for a setting item related to color printing.

The operation panel 2 and the multifunction peripheral 100 allow a better use of saved setting data D3 registered in another image forming apparatus. With reference to FIG. 13, a description will be given of a procedure for retrieving saved setting data D3 stored in the server 200.

First, on the operation panel 2, an instruction to access the server 200 can be entered. On recognizing an instruction to access the server 200 based on an output from the touch panel portion 22, the control portion 5 makes the communication portion 51 access the server 200. The server 200 stores information that identifies the source of saved setting data D3, such as a name or the name of the image forming apparatus in which it is registered. The control portion 5 makes the communication portion 51 acquire information identifying the source of saved setting data D3 from the server 200. Based on the acquired information, the control portion 5 makes the display panel 21 display a list of saved setting data D3 stored in the server 200.

An operation for selecting one of the displayed sets of saved setting data D3 is accepted as an operation for retrieving saved setting data D3 stored in the server 200. That is, the input portion (the touch panel portion 22 and the hardware keys 23) accepts an operation for retrieving saved setting data D3 stored in the communicably connected server 200. The procedure shown in FIG. 13 starts when an operation for retrieving saved setting data D3 stored in the server 200 is made.

First, the control portion 5 makes the communication portion 51 communicate with the server 200, and makes the communication portion 51 acquire specified saved setting data D3 (Step #31). Subsequently, the control portion 5 extracts, out of the saved setting data D3 acquired from the server 200, any setting value for an unavailable setting item (any unusable setting value) (Step #32). Specifically, the control portion 5 extracts, out of the acquired saved setting data D3, any setting value for an unavailable setting item.

The control portion 5 then checks whether or not any unusable setting value has been extracted at all (Step #33). When no unusable setting value has been extracted (Step #33, No), the control portion 5 writes the setting values defined in the saved setting data D3 acquired from the server 200 to the current value data D2, and thereby restores the setting state at the time of registration of the saved setting data D3 stored in the server 200 (Step #34 to End).

On the other hand, when any unusable setting value has been extracted (Step #33, Yes), the control portion 5 makes the display panel 21 display a setting value confirmation screen S5 that shows the unusable setting value (Step #35). When there are a plurality of unusable setting values, the control portion 5 makes the display panel 21 display one of the unusable setting values (Step #35).

In this embodiment, the multifunction peripheral 100 is a monochrome model. FIG. 14 shows an example of the setting value confirmation screen S5 displayed when the check at Step #33 results in Yes. FIG. 14 shows an example of the setting value confirmation screen S5 when saved setting data D3 that is related to a copy job and that has been registered in an image forming apparatus capable of color printing is retrieved from the server 200. As shown in FIG. 14, the control portion 5 has an unusable setting value displayed in the setting value confirmation screen S5. FIG. 14 shows an example where the saved setting data D3 retrieved from the server 200 contains a setting value that enables color printing.

In the setting value confirmation screen S5 are arranged a Cancel key K14 and an Invalidate key K15. When a user chooses not to use retrieved saved setting data D3, he operates the Cancel key K14. On the other hand, when a user choses to invalidate an unusable setting value so as not to use it, he operates the Invalidate key K15.

The control portion 5 checks whether or not the Cancel key K14 is operated (Step #35). When the control portion 5 recognizes that the Cancel key K14 is operated according to an output from the touch panel portion 22 (Step #36, Yes), the procedure can be ended (End). On the other hand, when the Invalidate key K15 is operated (Step #36, No), the control portion 5 recognizes that the user has chosen to invalidate the unusable setting value (Step #37).

The control portion 5 then checks whether or not, for all unusable setting values, their invalidation has been chosen (Step #38). When there is any unusable setting value that has not been invalidated (Step #38, No), the control portion 5 makes the display panel 21 display a setting value confirmation screen S5 showing one as-yet-invalidated unusable setting value (Step #39).

When all unusable setting values have been invalidated (Step #38, Yes), the control portion 5 changes the setting state of the operation panel 2 such that, for setting values other than unusable setting values, the setting values in the saved setting data D3 are set (Step #310 to End). In other words, the control portion 5 does not use unusable setting values but writes other setting values in the saved setting data D3 than the unusable setting values into current value data D2. Thus, even when saved setting data D3 acquired from the server 200 contains a setting value for a setting item that is not implemented in the retrieving-side multifunction peripheral 100, it does not have to be handled as an error. A user can then perform a job that largely reflects the content of the saved setting data D3 acquired from the server 200.

In some cases, for an extracted unusable setting value, another value can be substituted. In other cases, while there is a related setting item, the setting values at which it can be set does not completely match. For example, part of setting values that can be set in an image forming apparatus of an upper class (in a higher price zone) of the same line may not be selectable in an image forming apparatus of a lower class (in a lower price zone).

For an unusable setting value, another setting value may be substituted. To cope with such cases, the control portion 5 can be configured to display in the confirmation screen (on the display panel 21) a setting value (substitute value) that can be substituted when an unusable setting value is not used. In a case where a substitute value is displayed in the setting value confirmation screen S5, the storage portion 6 stores substitute value data D4 that defines which substitute value to substitute for which unusable setting value. The substitute value data D4 can be stored in the server 200 so that it can be acquired from the server 200.

Figure 15:
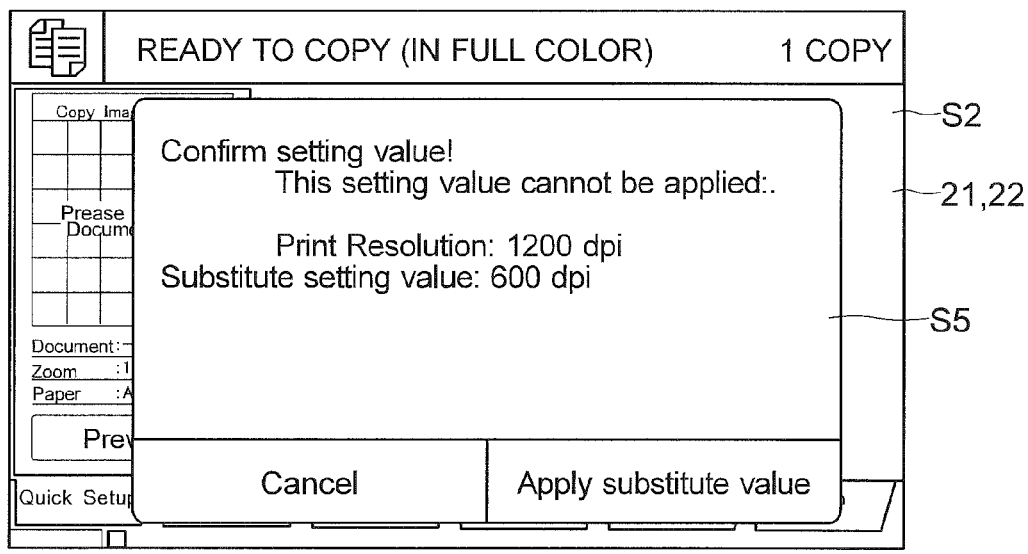
FIG. 15 is a diagram showing one example of a substitute value confirmation screen according to one embodiment.

When an unusable setting value is not used, the control portion 5, by using the substitute value data D4, makes the display panel 21 display a substitute setting value (substitute value). FIG. 15 shows one example of the setting value confirmation screen S5 for displaying a substitute value. FIG. 15 shows one example of the setting value confirmation screen S5 that is displayed when saved setting data D3 that is related to a copy job and that has been registered in an image forming apparatus capable of printing at a resolution as high as 1200 dpi is retrieved from the server 200. This is an example of the setting value confirmation screen S5 displayed when the retrieving-side image forming apparatus is of a lower class incapable of high-resolution printing. The control portion 5 has a substitute value displayed in the setting value confirmation screen S5. FIG. 15 shows an example where 600 dpi, which is the highest resolution in the image forming apparatus that has retrieved the saved setting data D3, is used as a substitute value.

In this case, the control portion 5 displays in the setting value confirmation screen S5 a key for accepting the choice of using the displayed substitute value. Then, on recognizing the choice of using the substitute value based on an output from the touch panel portion 22, the control portion 5 writes, as the setting value for the setting item which is an unusable setting value, the substitute value to the current value data D2. For setting values other than unusable setting values, the control portion 5 writes the setting value in the saved setting data D3 to the current value data D2. Thus, the operation panel 2 is now in a state that largely reflects the content defined in the saved setting data D3.

With the display/input device 1 according to the embodiment, after saved setting data D3 is registered, when a default value is changed, out of the setting values defined in the saved setting data D3, any which differs from the current default value is automatically extracted. The extraction results are then displayed. Thus, any setting value for which confirmation is needed is shown to a user. Moreover, as to the setting item corresponding to an extracted setting value, a user can choose whether to use the changed default value or the setting value defined in the saved setting data D3. This helps prevent an output unintended by a user from being yielded. It is then also easy to retrieve and use saved setting data D3.

The image forming apparatus (multifunction peripheral 100) according to the embodiment includes the display/input device 1 described above. It is thus possible to build an image forming apparatus (multifunction peripheral 100) that does not yield an output unintended by a user even when he performs a job by retrieving registered saved setting data D3.

The embodiment of the present disclosure specifically described above is not meant to limit the scope of the present disclosure. The present disclosure can be implemented with any modifications made within the spirit of the present disclosure.

What is claimed is:

1. A display/input device comprising:
a display panel which performs display;
an input portion which accepts input by a user;
a storage portion which stores
current value data containing a current setting value for a setting item,
default value data containing a default value of a setting value for a setting item, and
saved setting data which, when retrieved, is used to restore a setting state, the saved setting data containing
a setting value for a setting item at a time of registration thereof and
data indicating whether or not a setting value is a setting value changed from a setting value for a setting item at a time of registration thereof; and
a control portion
which, when an operation for retrieving saved setting data is made on the input portion, tries to extract, out of the setting value in the retrieved saved setting data, a setting value that has been registered without being changed from a default value at a time of registration of the saved setting data and that differs from a current default value and
which,
when no setting value is extracted, writes the setting value in the saved setting data to the current value data, thereby to restore the setting state at the time of registration of the saved setting data and,
when any setting value is extracted, displays, on the display panel, a value of the extracted setting value at a time of registration thereof along with the current default value,
writes, out of the value of the extracted setting value at the time of registration thereof and the current default value, a value which is selected by the user through the operation on the input portion to the current value data and
writes, for a setting value other than the extracted setting value, the setting value in the saved setting data to the current value data.

2. The display/input device of claim 1, wherein
the input portion accepts an operation for retrieving the saved setting data stored in a communicably connected server, and
the control portion
extracts, out of the setting value in the saved setting data acquired from the server, an unusable setting value which is a setting value for an unavailable setting item so that,
when no unusable setting value is extracted, the control portion writes the setting value in the saved setting data acquired from the server to the current value data, thereby to restore the setting state of the saved setting data at the time of registration thereof and,
when any unusable setting value is extracted, the control portion displays on the display panel the extracted unusable setting value and, when an input for invalidating the unusable setting value is made on the input portion, the control portion writes, out of the saved setting data, a setting value other than the unusable setting value to the current value data.

3. The display/input device of claim 2, wherein
when the extracted unusable setting value can be substituted for by another value,
the control portion displays on the display panel a substitute value which is a setting value to be substituted when the unusable setting value is not used and, on recognizing the user's choice of using the substitute value based on an output from a touch panel portion, the control portion writes the substitute value, as a setting value for the setting item which has the unusable setting value, to the current value data.

4. The display/input device of claim 1, wherein
the input portion accepts an input for selecting a setting item, an input for setting a setting value for the selected setting item, and a registration input for registering the saved setting data anew, and
when the input portion accepts the registration input, the control portion stores the current value data as the saved setting data in the storage portion.

5. The display/input device of claim 4, wherein
the control portion displays on the display panel a screen for entry of a name of the saved setting data to be registered, and on recognizing the input name based on an output from the touch panel portion, the control portion stores the saved setting data along with the name in the storage portion.

6. The display/input device of claim 1, wherein
the input portion accepts an input for selecting a setting item and an input for changing a default value for the selected setting item, and
when an input for changing the default value is made, the control portion updates the default value data to reflect the changed value.

7. An image forming apparatus comprising the display/input device of claim 1.

8. A method for controlling a display/input device, the method comprising:
storing
current value data containing a current setting value for a setting item,
default value data containing a default value of a setting value for a setting item, and
saved setting data which, when retrieved, is used to restore a setting state, the saved setting data containing
a setting value for a setting item at a time of registration thereof and data indicating whether or not a setting value is a setting value changed from a setting value for a setting item at a time of registration thereof;

trying, when an operation for retrieving saved setting data is made on the input portion, to extract, out of the setting value in the retrieved saved setting data, a selling value that has been registered without being changed from a default value at a time of registration of the saved setting data and that differs from a current default value;

writing, when no setting value is extracted, the setting value in the saved setting data to the current value data, thereby to restore the setting state at the time of registration of the saved setting data; and displaying, when any setting value is extracted, a value of the extracted setting value at a time of registration thereof along with the current default value on the display panel, and writing, out of the value of the extracted setting value at the time of registration thereof and the current default value, a value which is selected by the user through the operation on the input portion to the current value data and writing, for a setting value other than the extracted setting value, the setting value in the saved setting data to the current value data.

* * * * *